US009857656B2

(12) United States Patent
Seo et al.

(10) Patent No.: US 9,857,656 B2
(45) Date of Patent: Jan. 2, 2018

(54) ELECTRODE PLATE HAVING A METAL MESH PATTERN, AND ELECTROCHROMIC PLATE, ELECTROCHROMIC MIRROR AND DISPLAY DEVICE USING THE SAME

(71) Applicant: LG INNOTEK CO., LTD., Seoul (KR)

(72) Inventors: Young Dae Seo, Seoul (KR); Hyo Won Son, Seoul (KR); Joo Hyun Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 125 days.

(21) Appl. No.: 14/448,454

(22) Filed: Jul. 31, 2014

(65) Prior Publication Data

US 2015/0077361 A1 Mar. 19, 2015

(30) Foreign Application Priority Data

Sep. 17, 2013 (KR) ........................ 10-2013-0111727

(51) Int. Cl.
*G02F 1/155* (2006.01)
*G02F 1/1333* (2006.01)
(Continued)

(52) U.S. Cl.
CPC .............. *G02F 1/155* (2013.01); *B60R 1/088* (2013.01); *G02F 1/13338* (2013.01);
(Continued)

(58) Field of Classification Search
CPC .. G02F 1/133345; G02F 1/155; G02F 1/1523; G02F 1/13338; G02F 1/1343; G02F 1/136286; G02F 1/133512; G02F 3/044; H01G 9/2031; G01R 27/26; H01L 51/44; H05K 1/02; G06F 3/044; G06F 3/0412; G06F 2203/04102; G06F 2203/04103; G06F 2203/04112; B60R 1/088; B32B 17/06
(Continued)

(56) References Cited

U.S. PATENT DOCUMENTS 4,448,493 A * 5/1984 Matsudaira ........... G02F 1/1525
252/62.2
4,824,213 A * 4/1989 Morokawa ........ G02F 1/133512
349/111
(Continued)

OTHER PUBLICATIONS

European Search Report in European Application No. 14175089.3, dated Jan. 27, 2015.

*Primary Examiner* — Nalini Mummalaneni
*Assistant Examiner* — James Nokham
(74) *Attorney, Agent, or Firm* — Saliwanchik, Lloyd & Eisenschenk

(57) ABSTRACT

Provided are an electrode plate using an ITO, and an electrochromic plate, an electrochromic mirror and a display device using the electrode plate, the electrode plate including a transparent electrode layer, a metal mesh pattern on the transparent electrode layer, an insulating layer provided in a space defined by an upper surface of the transparent electrode layer and the metal mesh pattern and between metal components of the metal mesh pattern, and a base substrate on the metal mesh pattern and the insulating layer.

14 Claims, 7 Drawing Sheets

(51) Int. Cl.
  *G06F 3/044* (2006.01)
  *G06F 3/041* (2006.01)
  *B60R 1/08* (2006.01)
(52) U.S. Cl.
  CPC ............ *G06F 3/044* (2013.01); *G06F 3/0412* (2013.01); *G06F 2203/04102* (2013.01); *G06F 2203/04103* (2013.01); *G06F 2203/04112* (2013.01)
(58) Field of Classification Search
  USPC ................ 345/173–174; 349/106–111, 147; 359/266–273; 136/263, 252; 324/663
  See application file for complete search history.

(56) References Cited

U.S. PATENT DOCUMENTS

| | | | | |
|---|---|---|---|---|
| 4,853,296 | A * | 8/1989 | Fukuyoshi | G02F 1/133345 349/106 |
| 5,293,546 | A * | 3/1994 | Tadros | G02F 1/155 359/266 |
| 5,646,705 | A * | 7/1997 | Higuchi | G02F 1/133512 349/126 |
| 6,184,964 | B1 * | 2/2001 | Kameyama | G02F 1/134336 349/147 |
| 6,317,248 | B1 | 11/2001 | Agrawal et al. | |
| 6,952,299 | B1 * | 10/2005 | Fukazawa | G02F 1/1523 252/586 |
| 2003/0156314 | A1 * | 8/2003 | Shinozaki | G02F 1/15 359/273 |
| 2005/0034755 | A1 * | 2/2005 | Okada | B32B 17/06 136/256 |
| 2005/0185118 | A1 * | 8/2005 | Murade | G02F 1/136209 349/111 |
| 2005/0195488 | A1 * | 9/2005 | McCabe | B60R 1/088 359/603 |
| 2007/0095389 | A1 * | 5/2007 | Cho | H01G 9/2031 136/263 |
| 2011/0074444 | A1 * | 3/2011 | Makiranta | G01V 3/088 324/663 |
| 2012/0105752 | A1 * | 5/2012 | Park | G02F 1/13338 349/33 |
| 2012/0120476 | A1 * | 5/2012 | Yeh | G02B 27/22 359/270 |
| 2012/0134003 | A1 | 5/2012 | Yeh et al. | |
| 2013/0017321 | A1 * | 1/2013 | Kim | G06F 3/044 427/108 |
| 2014/0062908 | A1 * | 3/2014 | Ra | G06F 3/041 345/173 |
| 2014/0118635 | A1 * | 5/2014 | Yang | G06F 1/1692 349/12 |
| 2014/0346511 | A1 * | 11/2014 | Wu | G02F 1/136286 257/48 |

* cited by examiner

… (1)

ELECTRODE PLATE HAVING A METAL MESH PATTERN, AND ELECTROCHROMIC PLATE, ELECTROCHROMIC MIRROR AND DISPLAY DEVICE USING THE SAME

CROSS-REFERENCE TO RELATED APPLICATION

This application claims the benefit under 35 U.S.C. §119 of Korean Patent Application No. 10-2013-0111727, filed Sep. 17, 2013, which is hereby incorporated by reference in its entirety.

BACKGROUND

Field of the Invention

Embodiments of the present invention relate to an electrode plate using an Indium Tin Oxide (ITO), and an electrochromic plate, an electrochromic mirror and a display device using the electrode plate.

Description of the Related Arts

A transparent electrode and an electrode for display device applied to a light crystal device (LCD), an organic light emitting diode (OLED) and the like are constitutive elements which are basically necessary for a resistive type or electrostatic induction type touch screen. Furthermore, the transparent electrode is used in a light receiving element, a light emitting element as well as the field of organic solar cells, and is also used, as a large area transparent electrode, in electrochromic glass, namely, a smart window. In addition to this, the transparent electrode may be applied to a transparent film required to have an electromagnetic wave shielding function, and transparent glass to which the transparent film is applied. As a result, the use thereof has been widely increased.

A representative transparent electrode of transparent electrodes which have been commercialized up to the present is an Indium Tin Oxide (ITO) which is thinly coated on optical glass. In general, the ITO transparent electrode is produced by forming an electrode material including ITO particles on a glass substrate in a thin film form through a sputtering process, a digital printing process and the like. It is advantageous in that the ITO transparent electrode meets requirements for performance as a transparent electrode in most of electrical products such as a touch screen and the like.

However, since the ITO transparent electrode is manufactured using ITO particles, it is disadvantageous in that flexibility thereof is short to the extent such that it cannot be applied to flexible application products due to a limitation in uniformity of a particle size, distribution/dispersion and the like of the ITO particles. As flexible application products have become popular and the research & development thereof have been increased, a problem of a bending characteristic for the ITO transparent electrode has surfaced.

Also, since the conventional ITO transparent electrode has relatively high resistance compared to that of a conductive metal, it is problematic in that when it is applied to electrical products having a middle or large area, a reaction speed of the products is reduced. In particular, when it is used as a front electrode or a touch screen panel of an electrochromic mirror, a display device and the like, a control speed for discoloration and decolorization is reduced due to a relatively low reaction speed of the ITO transparent electrode, or a touch reaction of the display device is reduced, and as a result, it is problematic in that a user's convenience is reduced.

In addition, as an installation area in a large area device such as a smart window or a display device is gradually increased, the size and number of terminals for electrode control are increased, and accordingly, the number of terminals of a driving circuit unit is also increased. Thus, it is disadvantageous in that a manufacturing process becomes complex and a production cost is increased.

BRIEF SUMMARY

An aspect of embodiments of the present invention may provide an electrode plate capable of improving the flexibility of an ITO transparent electrode.

Another aspect of embodiments of the present invention may provide an electrode plate which enables an ITO to be easily applied to a large area product.

A further aspect of embodiments of the present invention may provide an electrochomic plate, an electrochomic mirror and a display device using the aforesaid electrode plate including the ITO.

According to an aspect of the embodiments of the present invention, an electrode plate may include: a transparent electrode layer; a metal mesh pattern on the transparent electrode layer; an insulating layer provided between an upper part of the transparent electrode layer and the metal mesh pattern; and a base substrate on the metal mesh pattern and the insulating layer.

In one embodiment, the transparent electrode layer may be an ITO (Indium Tin Oxide) and may have a thickness of 2000 Å or less.

In one embodiment, a thickness of the metal mesh pattern may range from 0.1 to 5 µm. Preferably, a thickness of the metal mesh pattern may range from 0.1 to 3 µm. More preferably, a thickness of the metal mesh pattern may range from 0.1 to 1 µm.

In one embodiment, a width of a pattern component of the metal mesh pattern may range from 0.1 to 10 µm. Preferably, a width of a pattern component of the metal mesh pattern may range from 1 to 7 µm. More preferably, a width of a pattern component of the metal mesh pattern may range from may range from 2 to 5.3 µm.

In one embodiment, the metal mesh pattern may include a first pattern component extending in a first direction and a second pattern component crossing the first pattern component.

In one embodiment, a cross region of the first and second pattern components may include a slope portion or a bent portion provided by removing corner regions from the cross region.

In one embodiment, the electrode plate may further include an electrode terminal connected to one side of the metal mesh pattern.

In one embodiment, the metal mesh pattern may include a first pattern region of first pattern pitches and a second pattern region of second pattern pitches being smaller than the first pattern pitches.

In one embodiment, the second pattern region may electrically connect the first pattern and the electrode terminal.

In one embodiment, the insulating layer may include an ultraviolet curable resin layer.

In one embodiment, a material of the base substrate may include PET (Polyethylene Terephthalate) or PES (Poly Ether Sulfones).

According to another aspect of the embodiments of the present invention, an electrode plate may include a first transparent electrode including an electrode plate; a second transparent electrode provided to face the first transparent electrode; and an electrochromic layer between the first transparent electrode and the second transparent electrode.

According to a further aspect of the embodiments of the present invention, an electrochromic mirror may include: a front electrode including an electrode plate of any one of the aforesaid embodiments; a rear electrode having a reflective layer facing the front electrode; an electrochromic layer between the electrode plate and the rear electrode; and a support member intended for supporting a mirror body including the front electrode, the rear electrode and the electrochromic layer and for fixing the mirror body to a vehicle.

According to yet another aspect of the embodiments of the present invention, a display device may include: a display substrate including a plurality of pixels and a driving circuit for driving the plurality of pixels; and a touch screen panel provided on one surface of the display substrate and including an electrode plate of any one of the aforesaid embodiments.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
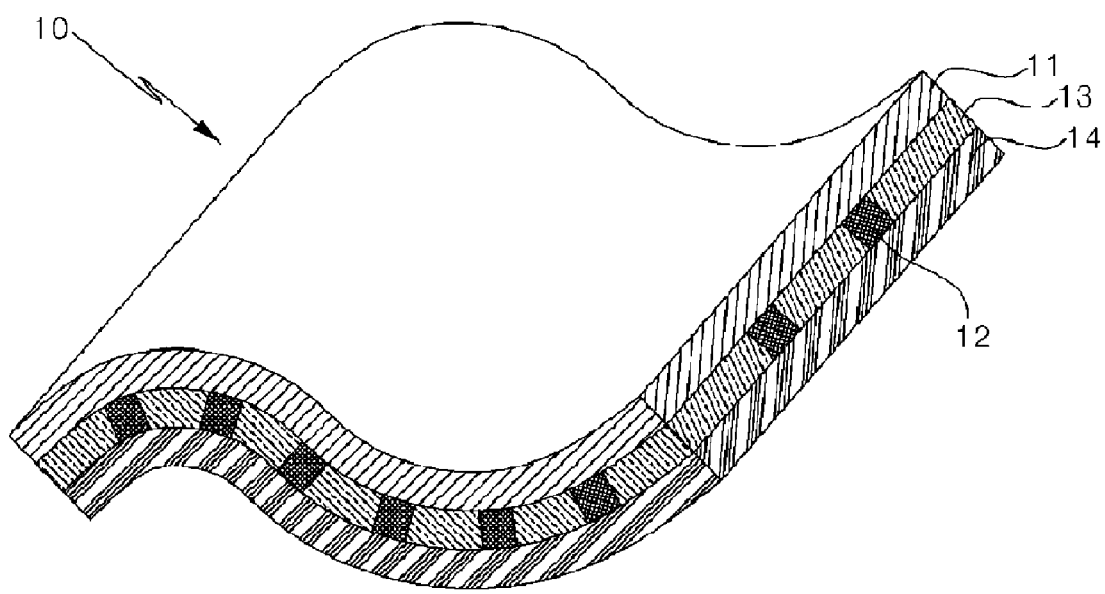
FIG. 1 is a perspective view showing an electrode plate according to one embodiment of the present invention.

Hereinafter, the preferred embodiments of the present invention will be described in detail with reference to the accompanying drawings in such a way as to be easily embodied by those having ordinary skill in the art. It should be understood that the embodiments described in this specification and the elements illustrated in the drawings are only examples for preferred embodiments of the present invention, various equivalents and modifications capable of replacing the embodiments at the time of the filing are possible.

Also, in the detailed explanation regarding operation principles for the preferred embodiments of the present invention, when it is judged that the detailed explanation on relevant well-known functions or elements may make the gist of the present invention unclear, the detailed description thereon is omitted. The terminologies or words used in the description and the claims in consideration of functions in the present invention should not be interpreted based on the contents throughout this specification. Like numbers refer to like elements having similar functions and showing similar operations through the drawings.

Furthermore, the terms, such as "beneath", "below", "lower", "above", "upper" and the like, may be used herein for ease of description to describe one element or a feature's relationship to another element or feature as illustrated in the Figures. It will be understood that the spatially relative terms are intended to encompass different orientations of the device in use or operation in addition to the orientation depicted in the Figures.

Figure 2:
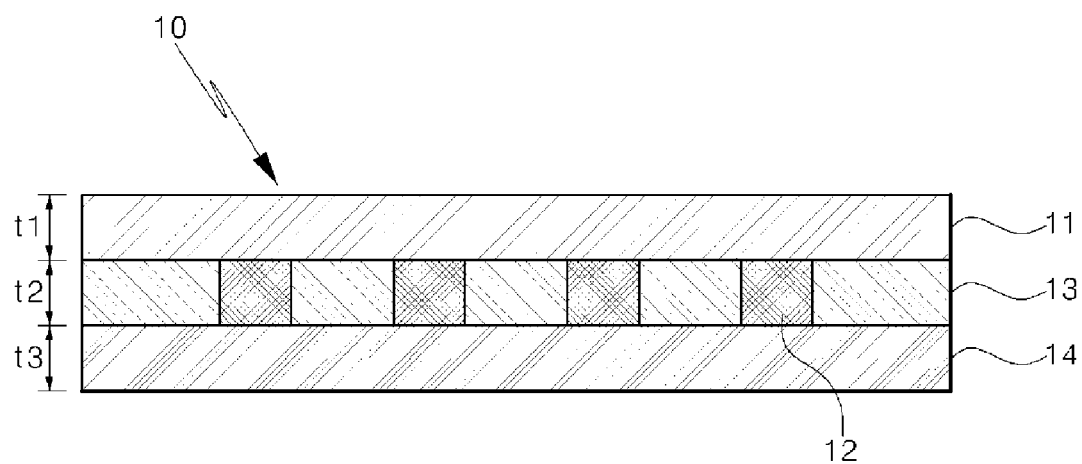
FIG. 2 is a front view of the electrode plate of FIG. 1.

FIG. 1 is a perspective view showing an electrode plate according to one embodiment of the present invention. FIG. 2 is a front view of the electrode plate of FIG. 1. Furthermore, FIG. 3 is a plane view showing metal mesh patterns of FIG. 1.

Figure 3:
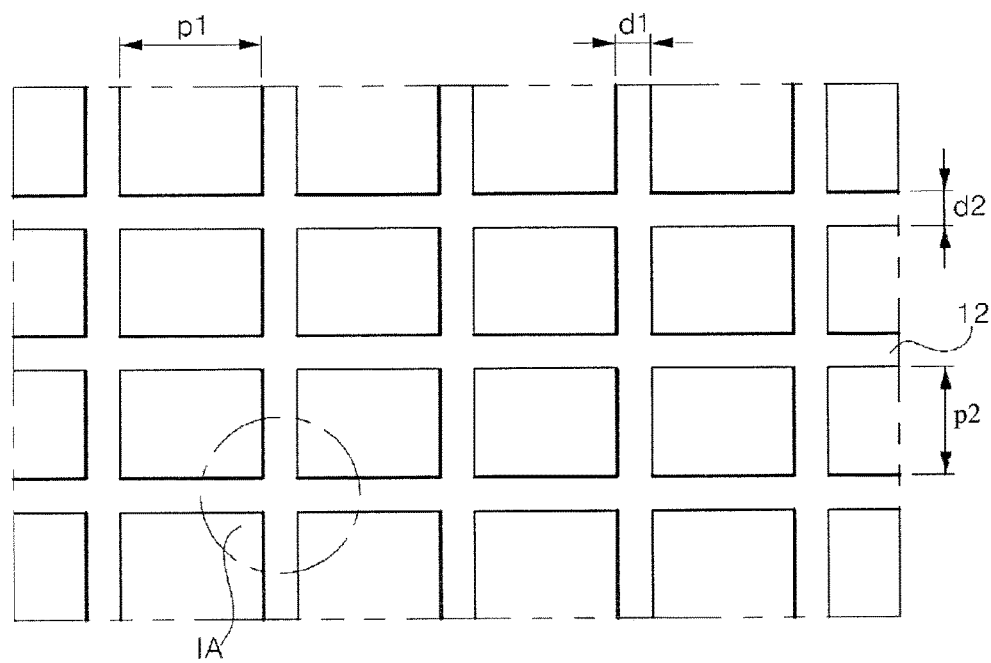
FIG. 3 is a plane view showing a metal mesh pattern.

Referring to FIGS. 1 to 3, an electrode plate according to the present embodiment includes: a transparent electrode layer 11; a metal mesh pattern 12 on the transparent electrode layer 11; an insulating layer 13 provided in a space between an upper part of one surface of the transparent electrode layer 11 and the metal mesh pattern 12; and a base substrate 14 on the metal mesh pattern 12 and the insulating layer 13.

The transparent electrode layer 11 contains an ITO (Indium Tin Oxide). A thickness t1 of the transparent electrode layer 11 is 2000 Å or less.

When the thickness t1 of the transparent electrode layer 11 exceeds 2000 Å, it is not effective in improving flexibility of the transparent electrode layer 11 even though the transparent electrode layer 11 is supported by forming the metal mesh pattern 12 on one surface of the transparent electrode layer 11, and accordingly, it is difficult to prevent the transparent electrode layer 11 from being easily damaged when the transparent electrode layer 11 is bent.

The metal mesh pattern 12 is provided on one surface of a lower side of the transparent electrode layer 11 in a mesh form with a material having a high conductivity, such as Ag, Cu and the like. A thickness t2 of the metal mesh pattern 12 ranges from about 0.1 to 5 µm. When the thickness t2 of the metal mesh pattern 12 is less than 0.1 µm, it is difficult to produce the metal mesh pattern, and when the thickness t2 of the metal mesh pattern 12 exceeds 5 µm, the metal mesh pattern may be observable by an external observer of an electrode plate, or may be easily broken when the electrode plate is bent. In consideration of this disadvantage or limitation and a process error, the thickness t2 of the metal mesh pattern 12 is preferably about 0.1 to 3 µm.

Also, the thickness t2 of the metal mesh pattern 12 is more preferably about 0.1 to 1 µm. When the thickness t2 of the metal mesh pattern 12 is 1 µm or less, it is advantageous in that the metal mesh pattern 12 of the electrode plate is not perfectly observed even in bright ambient environments of the outside of the electrode plate.

A width d1 or d2 of each of pattern components constituting the metal mesh pattern 12 in a mesh form ranges from about 0.1 to 10 µm. When the width of the pattern component is less than 0.1 µm, it is difficult to produce the pattern components, and when the width of the pattern component exceeds 10 µm, the pattern component may be observable by an external observer of the electrode plate or may be easily broken when the electrode plate is bent. In consideration of this disadvantage or limitation, a process error, the ease of production and the like, the width between the pattern components may be preferable about 1 to 7 µm. Also, the width d1 or d2 of the pattern component may be more preferably about 2 to 5.3 µm. When the width of the pattern component is 5.3 µm or less, it is advantageous in that the metal mesh pattern 12 of the electrode plate is not perfectly observed even in bright ambient environments of the outside of the electrode plate.

Furthermore, a pitch p1 or p2 between the pattern components is about 100 to 1000 mm. When the pitch p1 or p2 between the pattern components which are adjacent to each other in one direction is less than 100 mm, a material cost may be increased according to an increase in the amount of a pattern material which is used, and when the pitch p1 or p2 between the pattern components exceeds 1000 mm, a desired conductivity may not be obtained because the conductivity is lowered.

The thickness, width and pitch of the metal mesh pattern 12 are designed based on conductivity or electric resistance required according to an area to which the metal mesh pattern is applied, and a material of the metal mesh pattern. However, in the present embodiment, since the metal mesh pattern 12 supports the transparent electrode layer 11, damage, such as cracks and the like can be prevented from being generated when the transparent electrode layer is bent, and accordingly, in consideration of this function, the thickness, width and pitch may be designed.

The insulating layer 13 is prepared so as to fill spaces among the metal mesh patterns. The insulating layer 13 may be configured to contain a resin material. The insulating layer 13 may be provided in the same thickness as that of the metal mesh pattern 12 using an ultraviolet curable resin or a thermosetting resin according to a manufacturing method.

The base substrate 14 is configured such that the metal mesh pattern 12 and the insulating layer 13 are interposed between the base substrate 14 and the transparent electrode layer 11, thereby supporting the metal mesh pattern 12 and the insulating layer 13.

The base substrate 14 may be configured to contain a transparent film material, such as PET (Polyethylene Terephthalate), PES (Poly Ether Sulfones) and the like.

Even though the element is not illustrated in FIG. 1, the electrode plate 10 according to the present embodiment may have an adhesive layer (not drawn) between the metal mesh pattern 12 and the insulating layer 13, and the base substrate 14 according to a manufacturing method of the electrode plate 10 according to a manufacturing method.

The electrode plate according to the present embodiment may be produced by various manufacturing methods, and embodiments for some manufacturing methods will be briefly introduced as follows.

Manufacturing Method 1

First, a metal thin film including Ag or Cu as a main component is deposited on the base substrate 14, and the metal mesh pattern 12 of a predetermined pattern is formed by etching the metal thin film. Furthermore, the base substrate 14 on which the metal mesh pattern 12 is formed is coated with an ultraviolet curable resin, the insulating layer 13 is formed by hardening the resin through irradiation of ultraviolet rays, and then an ITO is deposited on the metal mesh pattern 12 and the insulating layer 13 to form the transparent electrode layer 11, thereby producing the electrode plate 10. Here, according to implementation, a flattening process for enabling a height of the ultraviolet curable resin or the insulating layer 13 to be identical to a height of the metal mesh pattern 12 may be additionally performed before or after the process for curing the ultraviolet curable resin.

Manufacturing Method 2

First, an ITO is deposited on a base substrate (not drawn) coated with a photo resist and the like to form the transparent electrode 11, a metal thin film including Ag or Cu as a main component is deposited on the transparent electrode layer 11, and thereafter, the metal mesh pattern 12 is formed by dry etching the deposited metal thin film. Furthermore, an ultraviolet resin is coated on a plate structure in which the metal mesh pattern 12 is formed, and the insulating layer 13 is formed by curing the resin through the irradiation of ultraviolet rays. Then, the base substrate 14 is bonded to the metal mesh pattern 12 and the insulating layer 13 by interposing an adhesive layer (not drawn) therebetween, and in addition to removal of the photo resist, the base substrate is removed from the transparent electrode 11, thereby manufacturing the electrode plate 10.

Manufacturing Method 3

First, an ultraviolet curable resin or a thermosetting resin is coated onto the inside of a frame of a worktable, and a resin layer is formed by curing the resin using ultraviolet rays or through the supply of heat. Next, a groove or an opening in a mesh form is formed in a resin layer by molding the resin layer, and the metal mesh pattern 12 and an intermediate layer of the insulating layer 13 are formed by filling the groove or opening with a metal material. Then, an adhesive layer is interposed between one surface of the intermediate layer and the base substrate 14 so that they can be bonded to each other, an ITO is deposited on another surface of the intermediate layer to form the transparent electrode layer 11, thereby producing the electrode plate 10.

As such, the electrode plate 10 according to the present embodiment may be manufactured by various other manufacturing methods in addition to the manufacturing methods described above.

FIG. 4 is a partially enlarged plane view showing another embodiment for an intersection of the metal mesh patterns of the FIG. 3.

Referring to FIG. 4, the metal mesh pattern 12 according to the present embodiment has a structure in which durability of the metal mesh pattern is increased at an intersection IA and electrical conductivity is also improved.

Figure 4A:
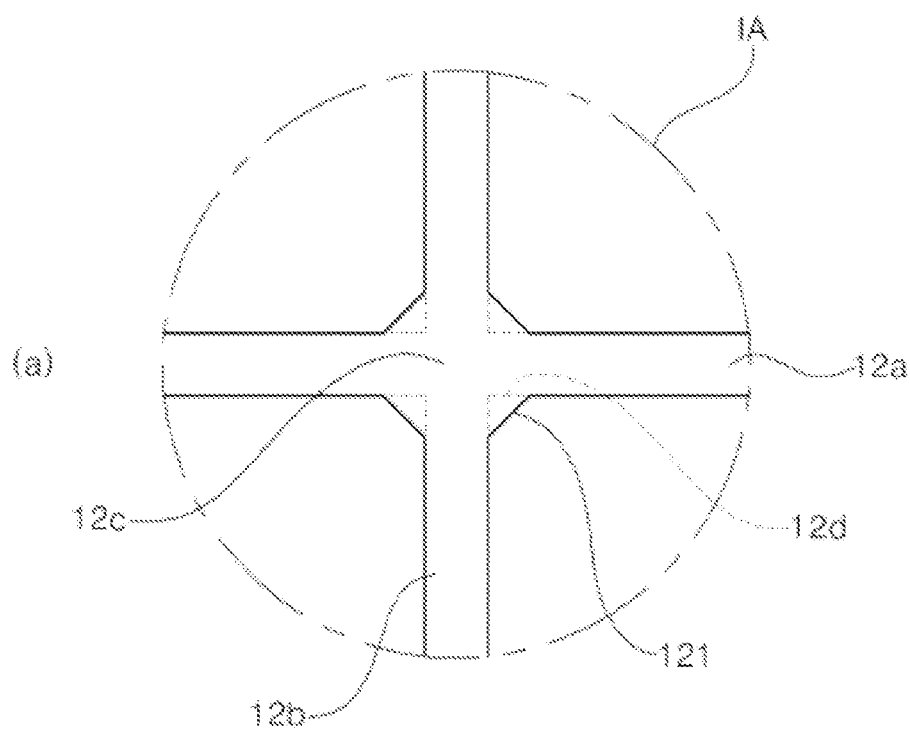
FIGS. 4a and 4b are partially enlarged plane view according to another embodiment of a intersection of the metal mesh pattern of FIG. 3.

As one example, as illustrated in FIG. 4(a), the metal mesh pattern 12 includes a first pattern component 12a extending in a first direction at the intersection IA and a second pattern component 12b crossing the first pattern component 12a and extending in a second direction, and a cross region 12c of the first and second pattern components has a slope portion 121 formed by removing a corner region 12d from the cross region 12c. Here, the slope portion 121 refers to an inclined portion having a predetermined slope with respect to the first direction and/or the second direction.

Figure 4B:
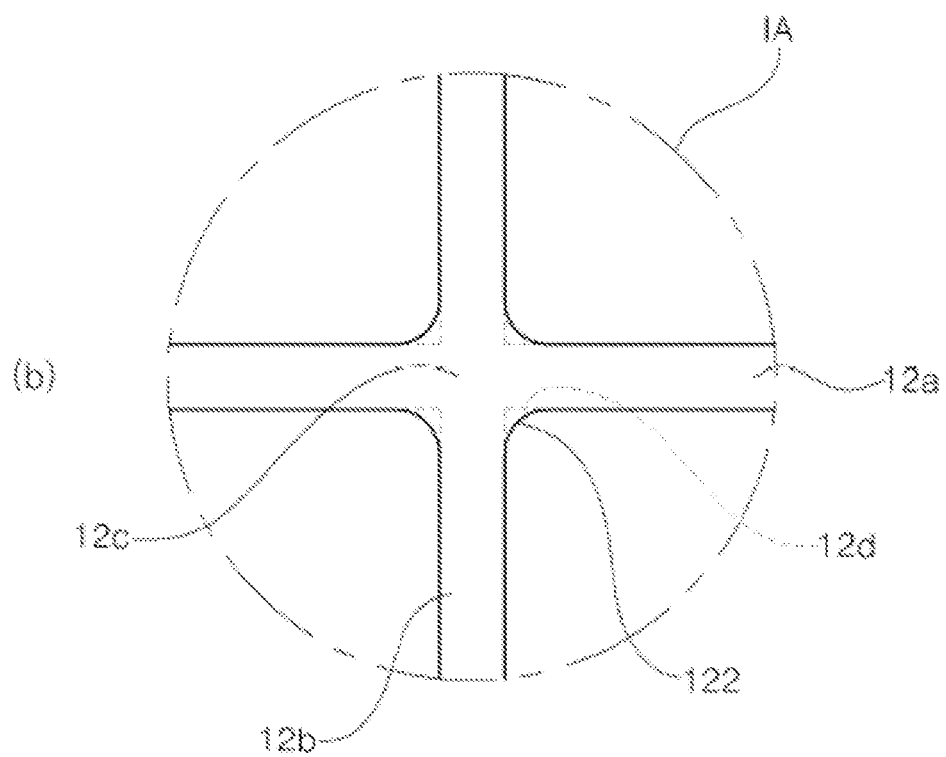

As another example, as illustrated in FIG. 4(b), the metal mesh pattern 12 has a bent portion 122 prepared in a form in which the corner region 12d is removed from the cross region 12c of the first and second pattern components 12a, 12b. Here, the bent portion 122 refers to a portion which is configured so that the first pattern component 12a extending in the first direction is naturally connected to the second pattern component 12b extending in the second direction crossing the first direction.

According to the slope portion 121 or the bent portion 122 as described above, it is advantageous in that degradation of the metal mesh pattern 12 can be prevented by preventing current flow from being concentrated at corner regions of a right intersection portion of the metal mesh pattern 12, and conductivity can be secured by making the flow of currents flowing into a surface of the metal mesh pattern 12 smooth.

Figure 5:
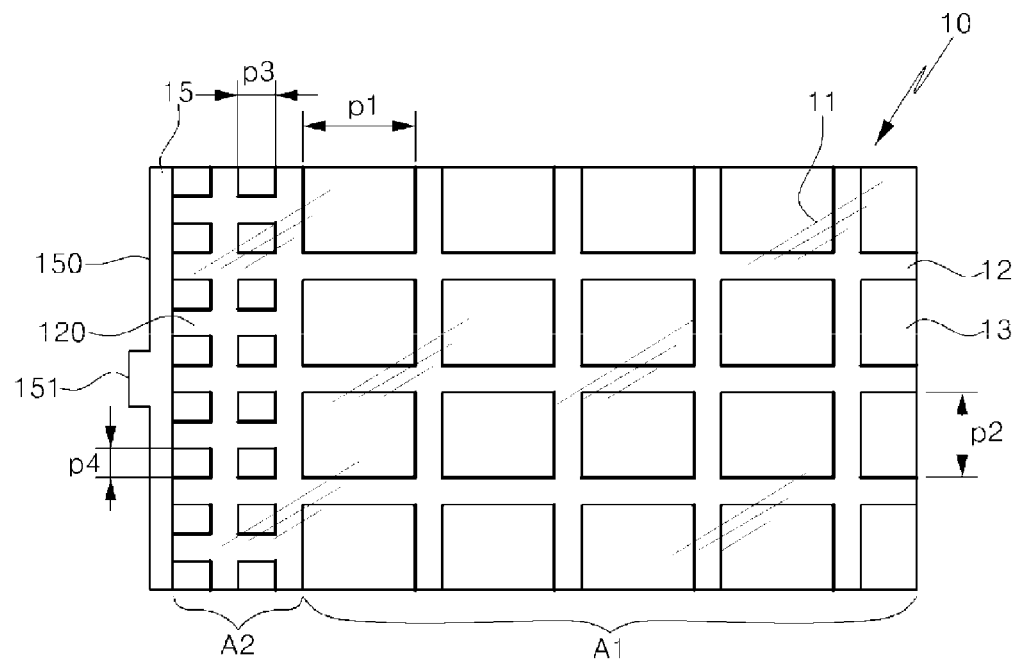
FIG. 5 is a partially plane view of an electrode plate according to another embodiment of the present invention.

FIG. 5 is a partially plane view of an electrode plate according to another embodiment of the present invention.

Referring to FIG. 5, the electrode plate 10 according to the present embodiment includes: the transparent electrode layer 11; the metal mesh pattern 12; the insulating layer 13; the base substrate 14; and an electrode terminal 15.

With regard to the transparent electrode layer 11, the metal mesh pattern 12, the insulating layer 13 and the base substrate, and a connection relation thereof, except for the fact that the metal mesh pattern 12 has a pattern form in which a pattern density is increased at some regions, the constitutive elements are substantially identical to the corresponding constitutive elements of the electrode plate as explained above based on FIGS. 1 to 4, and accordingly, the detailed description thereon will be omitted in order to avoid overlapping.

The metal mesh pattern 12 of the present embodiment is configured to include a first pattern region A1 and a second pattern region A2. The metal mesh pattern 12 of the first pattern region A1 has first widths (see d1 and d2 of FIG. 3) and first pattern pitches p1, p2. The metal mesh pattern 120 of the second pattern region A2 has second pattern pitches p3, p4.

The second pattern pitches p3, p4 of the metal mesh pattern 12 are smaller than the first pattern pitches p1, p2. In one embodiment, when each of the first pattern pitches p1, p2 is about 100 to 1000 mm, each of the second pattern pitches p3, p4 may be about 10 to 100 mm. Furthermore, the second widths of the metal mesh pattern 120 may be equal to the first widths thereof, be larger than them, or be smaller than them. Preferably, the second widths of the metal mesh pattern 120 are larger than the first widths of the metal mesh pattern.

The metal mesh pattern 120 of the second pattern region A2 is intended to electrically connect the electrode terminal 15 and the metal mesh pattern 12. Here, the metal mesh pattern 120 prevents a current bottleneck effect from being generated from ends of the pattern components when the ends of the plurality pattern components of the metal mesh pattern 12 are connected to the electrode terminal 15.

The electrode terminal 15 is connected to one side of the metal mesh pattern 12, namely, one side of the metal mesh pattern 120. The electrode terminal 15 receives a predetermined signal from the metal mesh pattern 12 or provides a predetermined signal to the metal mesh patterns 12, 120. Here, the signal includes a voltage and/or current.

The electrode terminal 15 may have a pad portion 151. The pad portion may be a portion in which one end of wirings connected to external circuits (drive circuits and the like) is fixed by solder and the like, and may be formed to protrude on an outer surface 150 of the electrode terminal 15 in a predetermined height.

Of course, according to implementation, the pad portion 151 may have a concave form resulting from being inserted in a predetermined depth at an outer surface 150 of the electrode terminal 15.

For efficient signal transmission with the metal mesh patterns 12, 120, at least one electrode terminal 15 or multiple electrode terminals may be disposed at one side or both sides. That is, when the metal mesh pattern 12 may have a large area form beyond a predetermined size, for the efficient arrangement of terminals, electrode terminal 15 may be divisionally disposed in multiple terminals and may function as an electrically single electrode via wirings (not drawn) common-connected to the pad portion 151 of the multiple terminals.

Figure 6:
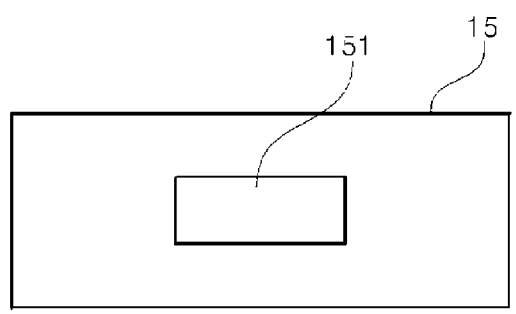
FIG. 6 is a right side view for a terminal of an electrode portion of the electrode plate of FIG. 5.

FIG. 6 is a right side view for a terminal of an electrode portion of the electrode plate of FIG. 5;

As illustrated in FIG. 6, the electrode terminal 15 according to the present embodiment may be connected to one side of the metal mesh pattern. Furthermore, in consideration of the convenience of production, in one side of the electrode plate, the electrode terminal 15 may be provided to cover the transparent electrode layer, the metal mesh pattern and the insulating layer, or to cover the transparent electrode layer, the metal mesh pattern, the insulating layer, and the base substrate.

The pad portion 151 of the electrode terminal 15 may be disposed in the center of one surface of the electrode terminal 15 without being limited thereto, and according to implementation, the pad portion may be provided at an edge of one surface of the electrode terminal 15, or may be provided in a form which protrudes at one side of the electrode terminal 15 in a predetermined length according to an insertion/contact position of wirings connected to the electrode plate.

According to the embodiment, even when an installation area of the electrode plate is increased, there is no need to excessively increase the size or number of electrode terminals according to the metal mesh pattern provided on one surface of the transparent electrode layer in proportion to high resistance (resistance when the metal mesh pattern is not provided) of the transparent electrode layer.

Figure 7:
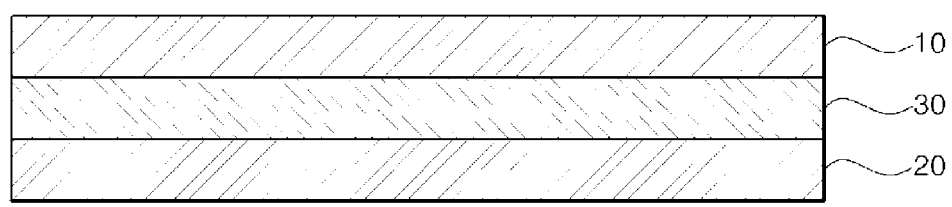
FIG. 7 is a schematically cross-sectional view of an electrochromic plate according to one embodiment of the present invention.

FIG. 7 is a schematically cross-sectional view of an electrochromic plate according to one embodiment of the present invention.

Referring to FIG. 7, an electrochromic plate according to the present embodiment is configured to include a first transparent electrode 10, a second transparent electrode 20 and an electrochromic portion 30.

The first transparent electrode 10 transmits an incident light of about 80% or more and contains a material having electrical conductivity beyond a predetermined level. In the present embodiment, the first transparent electrode 10 may be the electrode plate as explained above based on FIG. 1 or FIG. 5, or may include the electrode plate.

The second transparent electrode 20 may be a transparent electrode which is substantially identical to the first transparent 10, and may include the electrode plate previously explained based on FIG. 1 or FIG. 5 like the first transparent electrode 10.

By using an electrochromic principle in which color is changed color when a voltage is applied, the electrochromic portion 30 includes an element in which color is reversibly changed when a voltage is applied from the outside. The electrochromic portion 30 may further include a driving circuit (not drawn) intended for applying a voltage to the electrochromic portion 30.

Figure 8:
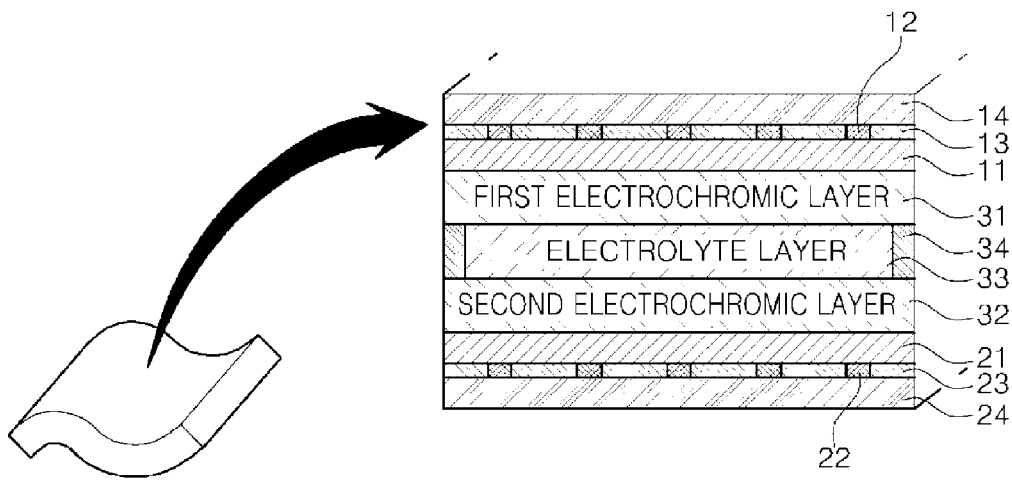
FIG. 8 is a schematically cross-sectional view showing a detailed structure of the electrochromic plate of FIG. 7.

FIG. 8 is a schematically cross-sectional view showing a detailed structure of the electrochromic plate of FIG. 7.

Referring to FIG. 8, the electrochromic plate according to the present embodiment includes: a first transparent electrode; a second transparent electrode; and an electrochromic portion. The electrochromic plate, which is a transmission type or reflection type double electrochromic element, may be applied to a smart window disposed in a place which is bent, such as a curved surface, the sunroof window of a vehicle, and the like so as to be operated as a transparent window or a non-transparent window.

The first transparent electrode includes the transparent electrode layer 11 prepared with an ITO, the metal mesh pattern 12, and the insulating layer 13 and the base substrate 14. The first transparent electrode of such a configuration includes the electrode plate previously explained based on FIG. 1 to FIG. 6, and the description thereon is omitted to avoid overlapping.

The second transparent electrode includes: the transparent electrode layer 21 prepared with an ITO, the metal mesh pattern 22, the insulating layer 23 and the base substrate 24. The respective constitutive elements of the second transparent electrode are substantially identical to the corresponding constitutive elements of the first transparent, and the description thereon is omitted to avoid overlapping.

The electrochromic portion includes: a first electrochromic layer 31; a second electrochromic layer 32; an electrolyte layer 33; and a sealing material 34. In one embodiment, when any one of the first electrochromic layer 31 and the second electrochromic layer 32 is omitted or is replaced with an electrode having an ion storage and a mirror surface (or a reflective layer), it may operate as a transmission type or a reflection type single electrochromic element according to whether or not the reflective layer is disposed.

A rapid discoloration time and a discoloration width having high transmittance are needed for the first electrochromic layer 31 or the second electrochromic layer 32. To do so, a WO3 based-reduction electrochromic material, a NiO-based oxidation electrochromic material, a Wiologen-based electrochromic material, and the like may be applied as a material of the first electrochromic layer 31 or the second electrochromic layer 32. The electrolyte layer 33 is a material intended for providing movement of ions for the discoloration of an electrochromic material, and a material in a solid, liquid, gel or sol state may be applied thereto. The sealing material 34 may be an encapsulant intended for sealing the periphery of the electrolyte layer 33 between the first electrochromic layer and the second electrochromic layer and may be composed of a material including alumina and silica particles.

Various configurations and operation principles of the electrochromic portion including the first electrochromic layer 31 and/or the second electrochromic layer, the electrolyte layer 33 and the sealing material 34 are well-known, and accordingly, the detailed description thereon is omitted. Also, since a driving module of the electrochromic portion is well-known, the description thereon is omitted to avoid overlapping.

Figure 9:
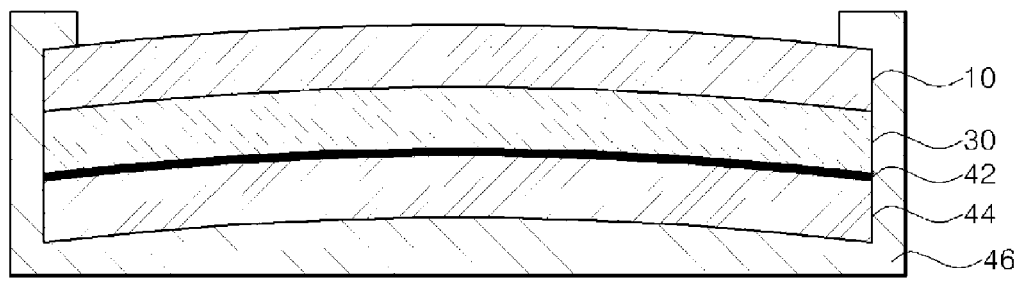
FIG. 9 is a schematically cross-sectional view showing an electrochromic mirror according to one embodiment of the present invention.

FIG. 9 is a schematically cross-sectional view showing an electrochromic mirror according to one embodiment of the present invention.

Referring to FIG. 9, the electrochromic mirror according to the present embodiment includes: the transparent electrode 10; the electrochromic portion 30; a reflective layer 42; a base film 44; and a support member 46. The electrochromic mirror has a driving module intended for controlling discoloration and decolorization (or decoloration) of the electrochromic portion 30, and since this driving module is well-known in the electrochromic technical field, the detailed description thereon is omitted.

The transparent electrode 10 is a front electrode of the electrochromic mirror. The transparent electrode 10 and the electrochromic portion 30 are substantially identical to the first transparent electrode and the electrochromic portion previously explained based on FIGS. 7 and 8.

The reflective layer 42 is provided on one surface of the electrochromic portion 30. When the reflective layer 42 has an electrode function, it may be made of a conductive metal material such as Ag and the like. According to implementation, the reflective layer 42 may be provided in a film form in which it is deposited on a separate layer intended for performing an electrode function, and in the case of the film form, the reflective layer 42 may include a synthetic resin dispersedly containing a white pigment.

A titanium oxide, aluminum oxide, zinc oxide, carbonate, barium sulfate, calcium carbonate and the like may be used as the white pigment, and PET (polyethylene terephthalate), PEN (polyethylene naphthalate), acrylic resin, PC (polycarbonate), PS (polystyrene), PO (polyolefin), CA (cellulose acetate), weather-resistant vinyl chloride and the like may be used as the synthetic resin.

The base film (44) may be configured such that the reflective layer 42 is interposed between the base film 44 and the electrochromic portion 30, and may contain a flexible material so as to be bent to face the electrochromic portion 30. The base film 44 may be made of the synthetic resin.

The reflective layer and the base film 44 may be replaced with a reflective electrode, and in this case, the reflective electrode is a rear electrode of an electrochromic mirror.

The support member 46 supports a mirror body including the transparent electrode 10, the electrochromic portion 30, the reflective layer 42 and the base film 46. The support member 46 may have a mirror housing form in which it is connected to a partial structure fixed to a vehicle or the structure of a vehicle. This structure or form of the support member 46 may be variously changed and implemented according to a designer' intention.

The electrochromic mirror according to the present embodiment may be used in a vehicle mirror. The vehicle mirror includes a room mirror of the vehicle, a side mirror of the vehicle and the like. Also, the electrochromic mirror may be configured to be bent with a predetermined curvature radius or curve according to the extension of a region onto which the mirror is projected, or a shape of an internal surface of a vehicle in which the vehicle mirror is installed. In this case, flexibility and durability of the transparent electrode may be secured by a structure of the electrode plate for reinforcing flexibility of an ITO.

According to the present embodiment, it may be provided with the electrochromic mirror that can be bent as a vehicle mirror and has excellent durability, reliability and a rapid electrochromic response speed. In other words, the electrochromic mirror for a vehicle should have a wide operation range so as to be maintained without degradation even under a change in environments (high temperature and humidity for the summer season, low temperature for winter season, etc.) of the inside of the vehicle. Also, when glariness resulting from a rear or rear-side vehicle is detected, the glariness should be reduced by reducing reflectivity for a short time within several seconds, and when headlights of the rear or rear-side vehicle disappear, reflectivity of the mirror should be changed so as to be high in its original state within the short time. In addition, since the glariness resulting from the headlights of the rear or rear-side vehicle upon nighttime driving disturbs a driver's view, it becomes a risk factor of vehicle safety, and accordingly, the glariness phenomenon must be removed. By using the transparent electrode provided using the electrode plate according to the present embodiment, a vehicle mirror which is optimized for the aforesaid vehicle environments can be effectively implemented.

Figure 10:
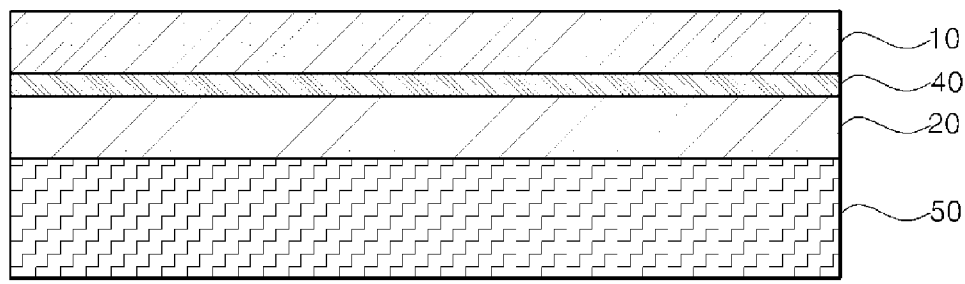
FIG. 10 is a schematically cross-sectional view of a display device according to one embodiment of the present invention.
Figure 11:
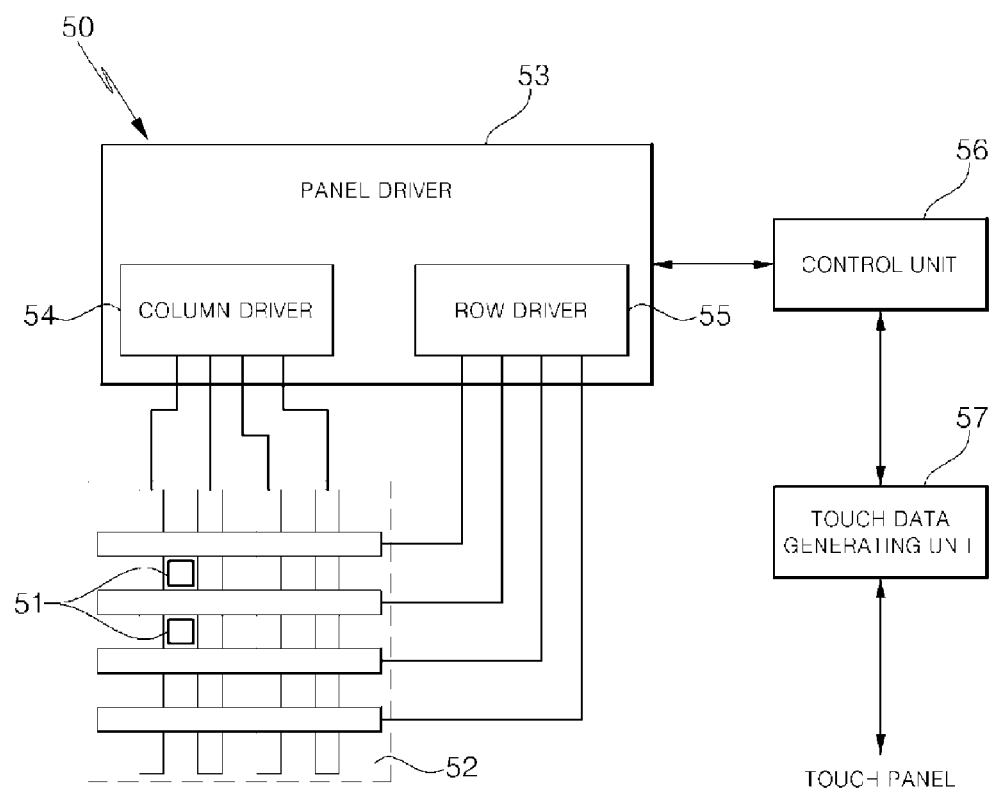
FIG. 11 is a schematically block diagram intended for explaining a display substrate of the display device of FIG. 10.

FIG. 10 is a schematically cross-sectional view of a display device according to one embodiment of the present invention and FIG. 11 is a schematically block diagram intended for explaining a display substrate of the display device of FIG. 10.

Referring to FIG. 10, a display device according to the present embodiment includes: the first transparent electrode 10 and the second transparent electrode 20 disposed to face each other; the insulating layer 40 provided between the first transparent electrode 10 and the second transparent electrode 20; a display substrate 10 connected to a touch screen panel provided to the first transparent electrode 10, the second transparent electrode 20 and the insulating layer 40.

The first transparent electrode 10 and the second transparent electrode 20 corresponds to the first transparent electrode and the second transparent previously explained based on FIGS. 7 and 8, respectively.

The insulating layer 40 may be provided in a liquid or solid state, and the first and second transparent electrodes 10, 20 may be spaced apart from each other to the extent of a predetermined distance. When the insulating layer 40 is provided as a solid insulating layer, it may serve as an adhesive layer.

The display substrate 50 refers to a module including a driving circuit unit and a pixel unit which are operated by an LCD (Liquid Crystal Display) device and a display device using an OLED (Organic Light Emitting Diode).

Explaining it in greater detail, as illustrated in FIG. 11, the display substrate 50 includes: a pixel unit 52 having a plurality of pixels 51; a panel driver 53 supplying a control signal and electricity (voltage or current) to a column line and row line; a control unit 56 supplying a picture signal, a timing control signal, a driving control signal and the like to the panel driver 53; and a touch data generating unit 57 for sensing a signal from a touch screen panel and converting the sensed signal into a predetermined form, thereby transmitting the converted signal to the control unit 56.

Here, the panel driver 53 may include: a power supply unit (not drawn) supplying electricity to constitutive elements (including a pixel portion) in a display substrate; a column driver 54 supplying an electrical signal to a column line of the pixel portion 52; and a row driver 55 supplying an electrical signal to a row line of the pixel portion 52.

According to the present embodiment, the touch screen panel including the first transparent electrode 10, the insulating layer 40 and the second transparent electrode 20 and operating in a touch mode capacitive mode may operate such that a voltage is applied to four corners of the touch screen panel, the touch data generating unit 57 senses a waveform changed by an object (fingers and the like) touching a surface of the panel, and the control unit 56 calculates a touch position of the object based on the sensed data.

In particular, according to the present embodiment, when the display device is implemented as a large area flexible display device using an LCD or an organic light emitting diode, durability and reliability of the large area flexible display device can be improved thanks to the touch screen panel provided using the electrode plate of FIGS. 1 to 6, and a production cost can be reduced.

As set forth above, according to some embodiments of the present invention, since the transparent electrode layer provided with an ITO transparent electrode is supported, and the metal mesh pattern structure in which electric resistance of the transparent electrode layer is reduced is used, flexibility of the transparent electrode layer can be improved when the transparent electrode layer is bent, thereby preventing the ITO transparent electrode layer from being damaged. As a result, the electrode plate having improved durability and reliability and the device (an application product of a smart window, an electrochromic mirror, a display device and the like) using the electrode plate can be provided.

Also, according to some embodiments of the present invention, the electrode plate having improved applicability to a large area and flexibility can be easily used in the transparent electrode or the touch screen panel of the application product, and in the large area application product, the size or number of electrode terminals connected to the transparent electrode can be reduced. Furthermore, since an electrochromic material is coated as a thin film, the large area flexible application product can be easily manufactured, a production cost can be reduced, and durability and reliability can be improved.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. An electrode plate, comprising:
   a transparent electrode layer;
   a metal mesh pattern on the transparent electrode layer;
   an electrode terminal connected to one side of the metal mesh pattern;
   an insulating layer on the transparent electrode layer; and
   a base substrate on the metal mesh pattern and the insulating layer;
   wherein the base substrate comprises an opening area and a metal area, wherein the opening area exposes a surface of the base substrate,
   wherein the insulating layer is in direct contact with the metal mesh pattern,
   wherein the transparent electrode layer is in direct contact with the metal mesh pattern,
   wherein the metal mesh pattern comprises a first pattern component extending in a first direction and a second pattern component crossing the first pattern component,
   wherein a region of the first pattern component crossed by the second pattern component comprises a slope portion or a bent portion in a plane of the metal mesh pattern,
   wherein the metal mesh pattern comprises a first pattern region of first pattern pitches and a second pattern region of second pattern pitches located at a same side of the metal mesh pattern, each of the second pattern pitches being smaller than each of the first pattern pitches;
   wherein the second pattern region electrically connects the first pattern region and the electrode terminal,
   wherein the transparent electrode layer contains an ITO,
   wherein the metal mesh pattern is formed with Ag or Cu, and
   wherein a pad portion is disposed in a center of a surface of the electrode terminal, the pad portion protruding from the surface of the electrode terminal with a predetermined height.

2. The electrode plate of claim 1, wherein the transparent electrode layer is an ITO (Indium Tin Oxide) and has a thickness of 2000 Å or less.

3. The electrode plate of claim 2, wherein a thickness of the metal mesh pattern ranges from 0.1 to 5 μm.

4. The electrode plate of claim 2, wherein a thickness of the metal mesh pattern ranges from 0.1 to 3 μm.

5. The electrode plate of claim 2, wherein a thickness of the metal mesh pattern ranges from 0.1 to 1 μm.

6. The electrode plate of claim 2, wherein a width of a pattern component of the metal mesh pattern ranges from 0.1 to 10 μm.

7. The electrode plate of claim 2, wherein a width of a pattern component of the metal mesh pattern ranges from 1 to 1 μm.

8. The electrode plate of claim 2, wherein a width of a pattern component of the metal mesh pattern ranges from 2 to 5.3 μm.

9. The electrode plate of claim 1, wherein the slope portion or the bent portion is provided by removing a corner region from the region of the first pattern component crossed by the second pattern component.

10. The electrode plate of claim 1, wherein the insulating layer is an ultraviolet curable resin layer.

11. The electrode plate of claim 1, wherein a material of the base substrate comprises PET (Polyethylene Terephthalate) or PES (Poly Ether Sulfones).

12. An electrochromic plate, comprising:
a first transparent electrode including an electrode plate of claim 1;
a second transparent electrode provided to face the first transparent electrode; and
an electrochromic layer between the first transparent electrode and the second transparent electrode.

13. An electrochromic mirror, comprising:
a front electrode including an electrode plate of claim 1;
a rear electrode having a reflective layer facing the front electrode;
an electrochromic layer between the electrode plate and the rear electrode; and
a support member intended for supporting a mirror body including the front electrode, the rear electrode and the electrochromic layer and for fixing the mirror body to a vehicle.

14. A display device, comprising:
a display substrate including a plurality of pixels and a driving circuit for driving the plurality of pixels; and
a touch screen panel provided on one surface of the display substrate and including an electrode plate of claim 1.

* * * * *